United States Patent [19]

Geary

[11] Patent Number: 4,551,062
[45] Date of Patent: * Nov. 5, 1985

[54] DEVICE FOR PASSING A FLUID FLOW THROUGH A BARRIER

[75] Inventor: Alan P. Geary, Bristol, England

[73] Assignee: Rolls-Royce Limited, London, England

[*] Notice: The portion of the term of this patent subsequent to Sep. 4, 2001 has been disclaimed.

[21] Appl. No.: 646,298

[22] Filed: Aug. 31, 1984

Related U.S. Application Data

[63] Continuation of Ser. No. 486,078, Apr. 18, 1983, Pat. No. 4,469,470.

[30] Foreign Application Priority Data

Apr. 21, 1982 [GB] United Kingdom ............... 8211492

[51] Int. Cl.$^4$ ............. F01D 5/08; F01D 5/18
[52] U.S. Cl. ................. 415/115; 60/39.75; 416/95
[58] Field of Search ........... 415/115, 116, 117, 72, 415/73, 216, 217; 60/39.75, 39.83, 39.45 R, 39.45 A, 39.512; 416/90 R, 91, 92, 95, 96 R, 96 A, 97 R, 97 A

[56] References Cited

U.S. PATENT DOCUMENTS

| | | | |
|---|---|---|---|
| 1,148,994 | 8/1915 | Schmidt | 415/73 |
| 2,928,650 | 3/1960 | Hooker et al. | 416/95 |
| 2,988,325 | 6/1961 | Dawson | 416/96 R |
| 3,748,060 | 7/1973 | Hugoson et al. | 416/92 |
| 3,791,758 | 2/1974 | Jenkinson | 415/116 |
| 3,826,084 | 7/1974 | Branstrom et al. | 415/115 X |
| 3,832,090 | 8/1974 | Matto | 416/95 |
| 3,916,620 | 11/1975 | Ketley | 415/216 X |
| 3,945,758 | 3/1976 | Lee | 415/115 X |
| 4,035,102 | 7/1977 | Maghon | 416/95 |
| 4,178,129 | 12/1979 | Jenkinson | 416/193 A X |
| 4,469,470 | 9/1984 | Geary | 415/115 |

FOREIGN PATENT DOCUMENTS

| | | |
|---|---|---|
| 762679 | 12/1956 | United Kingdom . |
| 877989 | 9/1961 | United Kingdom . |
| 1276377 | 6/1972 | United Kingdom . |
| 1350471 | 4/1974 | United Kingdom . |
| 1424925 | 2/1976 | United Kingdom . |
| 1523652 | 9/1978 | United Kingdom . |
| 1541533 | 3/1979 | United Kingdom . |
| 1561229 | 2/1980 | United Kingdom . |
| 2054046 | 2/1981 | United Kingdom . |
| 2063376 | 3/1981 | United Kingdom . |
| 2075123 | 11/1981 | United Kingdom . |

Primary Examiner—Carlton R. Croyle
Assistant Examiner—Jeffrey A. Simenauer
Attorney, Agent, or Firm—Parkhurst & Oliff

[57] ABSTRACT

A device is provided for passing a fluid flow across a static or rotating barrier wherein there is relative rotation between the flow and the barrier and wherein it is necessary to pass the maximum of flow through the device while keeping the diameter of the device as small as possible.

Figure 2:
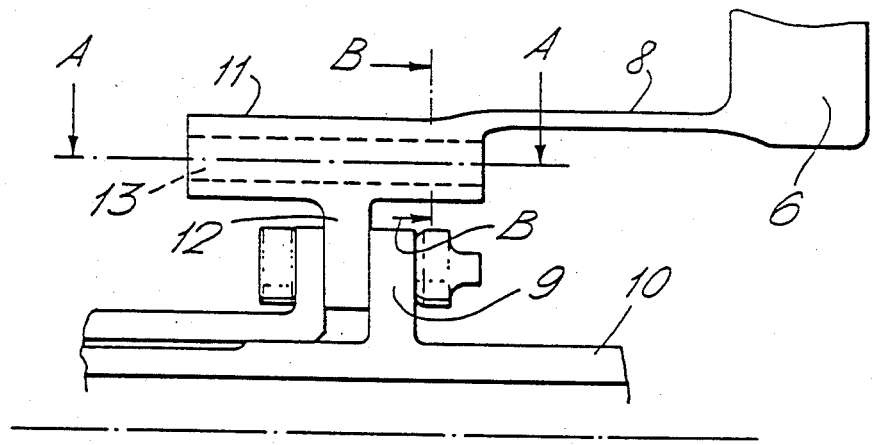

One embodiment of the invention shown in FIG. 2 is a device for use in a gas turbine engine for supplying cooling air across a bolted joint to a space behind a cover plate 6 for cooling an engine disc. The device comprises a cylindrical receiver 11 having helical slots 13 running through it from one axial end face to the other, the helix angle being the same as the angle of the relative velocity vector between the flow and the slots.

The helical shape of the slots ensures that the radius of the axis of each slot is constant along the length of the slots and allows greater slot height and hence greater flow area.

9 Claims, 6 Drawing Figures

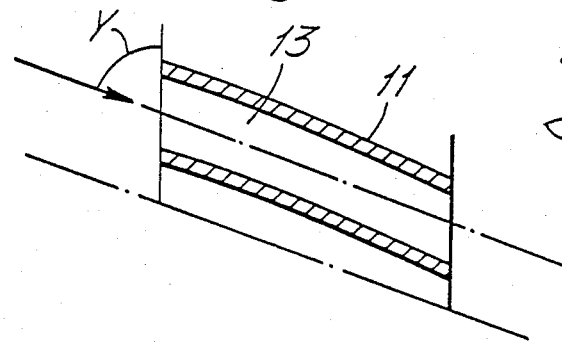
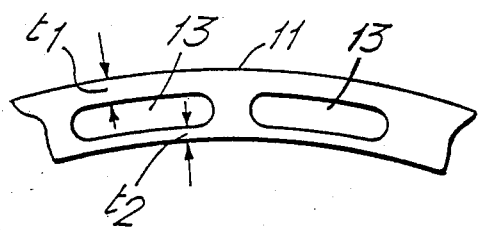
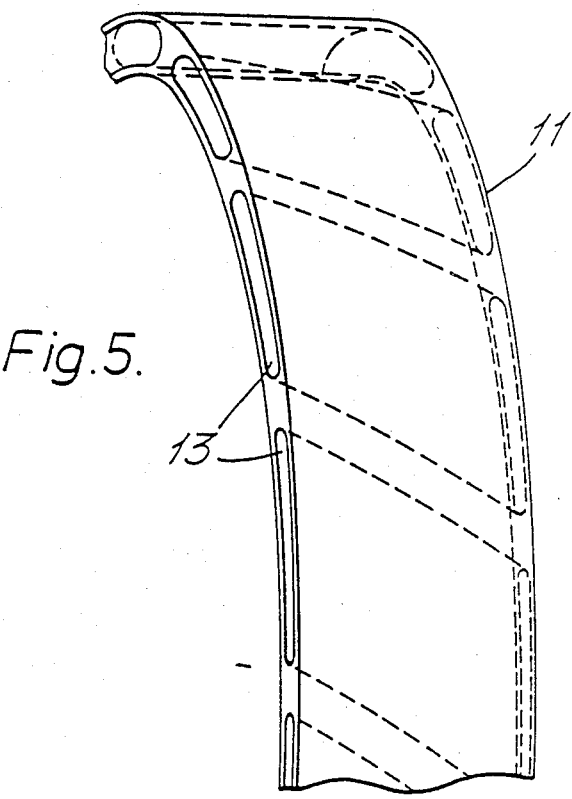

DEVICE FOR PASSING A FLUID FLOW THROUGH A BARRIER

This is a continuation of application Ser. No. 486,078 filed Apr. 18, 1983, now U.S. Pat. No. 4,469,470.

The present invention relates to a device for passing a fluid flow through a barrier, and relates in particular to such a device for use where there is relative rotation between the fluid flow and the barrier.

A problem which arises in gas turbine engines is the movement of cooling air from a supply region at the compressor end of the engine to the hot region at the turbine end of the engine where it is used for cooling the blades and discs of the turbine rotors.

As engines are designed to run hotter and hotter to improve the cycle efficiencies, greater quantities of cooling air are required to be moved between the cooler and hotter regions of the engine. It sometimes occurs that a flow of cooling air is required to pass through the bore of a rotor disc at the radially inner region thereof, to reach a more downstream part of the engine, which often means that the air has to pass through a wall, e.g. the shaft driving the rotor disc. This means providing a circumferentially spaced array of apertures in the wall for the passage of the air flow, but if the region in which the holes are required is at a relatively small radius it may not be possible to provide sufficient area in the apertures to pass the required amount of flow.

The area of the apertures can be increased by providing the holes in a cylindrical or conical receiver which provides some axial length across the barrier. This gives added strength to the receiver and enables the holes to be more closely spaced. The area can be further increased at the same radius if the apertures are elongated circumferentially instead of having a circular cross-section.

However, in most gas turbine engine applications there will be relative rotation between the air flow and the barrier, and this requires that the apertures must be angled to minimise losses in the flow as it passes through the apertures. Angling the slots puts a limitation both on the radial and circumferential dimensions of the slots to avoid reducing the thickness of the walls of the receiver, because the axes of the slots are no longer a constant radius from the axis of the cylinder along their lengths.

It is one object of the present invention to provide a device which has a greater area for gas flow at a given radius than has hitherto been achieved.

The above-described problems are resolved, and the stated object is achieved along with other advantages, by the provision of a device according to the invention as claimed in the appendent claims, wherein the device is provided in the form of a receiver of annular cross-section connected to the barrier and having a plurality of circumferentially spaced helical slots running through it from one axial end face to the other, the slots being angled at the angle of the relative velocity vector between the flow and the barrier.

By this means the axis of each of the slots remains at a constant distance from the axis of the device, and the radial wall thickness above and below the slot remains constant. Thus the radial and circumferential dimensions of the slots can be increased.

Figure 1:
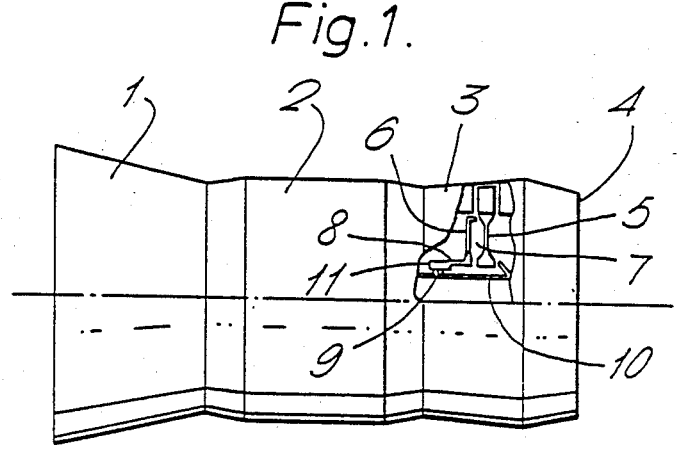
Figure 6:
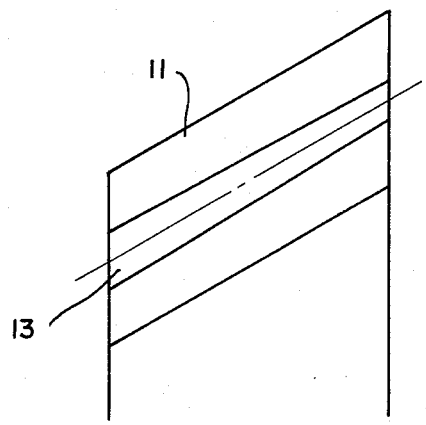

Examples of the present invention will now be more particularly described with reference to the accompanying drawings in which:

FIG. 1 is a diagrammatic representation of a gas turbine engine incorporating a device according to the present invention, FIG. 2 is a sectional elevation of a part of the turbine section of the engine of FIG. 1 showing the device in more detail, FIG. 3 is an enlarged cross-section on the line A—A of FIG. 2, FIG. 4 is an enlarged cross-sectional view on the line B—B of FIG. 2, and, FIG. 5 is a perspective view of part of the device alone from FIG. 2, FIG. 6 is an enlarged cross-sectional view of an alternative embodiment of the device.

Referring now to the drawings, the gas turbine engine of FIG. 1 may be of any conventional type including compressor means 1, combustion equipment 2, turbine means 3 and an exhaust nozzle 4 all in flow series. The turbine means includes bladed rotor discs 5, only one of which is shown. Upstream of the disc 5 is a cover plate 6 which is spaced from the disc to define a space 7 into which cooling air from the compressor is directed for cooling the upstream face of the disc. The cover plate is attached to the rotor disc 5 at its radially outer periphery and has a cylindrical extension 8 by means of which it is connected at a bolted joint 9 to an engine main shaft 10 for rotation therewith. The shaft 10 interconnects the turbine means 3 and the compressor means 1. The cooling air passes across the bolted joint 9 via a cylindrical receiver 11 which is shown in greater detail in FIGS. 2 to 5.

The receiver 11 has a flange 12 which forms part of the joint 9, and has a plurality of circumferentially spaced slots 13 extending therethrough from one axial end face to the other. The slots 13 follow a helical path through the cylinder and the helix angle is chosen to match as nearly as possible the relative velocity vector angle Y between the cooling air flow and the receiver 11 to minimise pressure losses as the flow passes through the receiver. The air flow may itself be caused to swirl by passing it through pre-swirl nozzles (not shown) upstream of the receiver, or may have swirl imposed on it due to contact with rotating parts of the engine. In all cases, however, the helix angle is arranged such that there is no relative circumferential velocity between the gas flow and the slots.

Because the slots follow a helical path the centre-line of each slot remains at the same radius from the axis of the receiver for the whole of its length. Thus the wall thickness t1 and t2 (FIG. 4) remain constant along the length of the slot. The main advantage which flows from this is that the cross-sectional area of each slot can be enlarged compared to a straight-sided, angled slot because no allowance has to be made for a change in wall thickness along the length of the slot. Thus more air can be passed through the receiver at the same radius. Alternatively the same flow can be passed through a smaller receiver thus saving weight and material costs.

As an additional advantage, the fact that the slots run helically through the receiver enables all of the slots to be machined simultaneously by an electro-chemical or electro-discharge machining process in which a single electrode having helical machining fingers can be "screwed" axially into the receiver while machining takes place.

The axial length of the receiver is determined partly by the stress requirements but also by the need to recover any pressure losses due to contraction of the air flow stream lines on entry of the air flow into the slots. Thus the slots act as diffusers to minimise pressure losses in the flow.

Although the invention has been described with reference to a cylindrical receiver, clearly other shapes could possibly be used, for example, frustoconical, depending on the position of the barrier and the space limitations within the engine. See, for instance, FIG. 6 showing frustoconical receiver 11.

A further application of the invention in a gas turbine engine is for the pre-swirl nozzles usually provided for swirling cooling air into receivers in blade roots.

Although the specific embodiments described above relate to gas flows in gas turbine engines it is envisaged that this invention is generally applicable to any fluid flow where the same problem exists.

I claim:

1. A device for allowing passage of a fluid flow through a barrier in a turbine engine where there is relative rotation between the barrier and the fluid flow, comprising
   a receiver connected to the barrier in the turbine engine and having an annular cross section about a longitudinal axis and having a plurality of circumferentially spaced slots passing therethrough, each slot having an opening at each opposite axial end of said slot and having a helical longitudinal axis which is inclined relative to the longitudinal axis of the receiver at an angle substantially equal to an angle of a relative approach velocity vector of the fluid approaching the receiver.

2. A device as claimed in claim 3, wherein each said slot is elongated circumferentially.

3. A device as claimed in claim 3, wherein said slots define an inner wall and an outer wall of said receiver, and respective thicknesses of said inner wall and said outer wall remain constant across said receiver.

4. A device as claimed in claim 5, wherein said receiver is cylindrical.

5. A device as claimed in claim 5, wherein said receiver is frustoconical.

6. A device as claimed in claim 3, wherein said receiver connects said barrier to a rotational shaft.

7. A device as claimed in claim 6, wherein said barrier is a cover plate for a rotor disk of said turbine engine.

8. A device as claimed in claim 7, wherein said shaft is an engine main shaft of said turbine engine.

9. A device as claimed in claim 6, wherein said receiver is connected to said barrier via a cylindrical extension member.

* * * * *